US011675718B2

(12) United States Patent
Morton et al.

(10) Patent No.: US 11,675,718 B2
(45) Date of Patent: Jun. 13, 2023

(54) ENHANCED LOW-PRIORITY ARBITRATION

(71) Applicant: Advanced Micro Devices, Inc., Santa Clara, CA (US)

(72) Inventors: Eric Christopher Morton, Austin, TX (US); Pravesh Gupta, Bengaluru (IN); Bryan P Broussard, Austin, TX (US); Li Ou, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/214,771

(22) Filed: Mar. 26, 2021

(65) Prior Publication Data

US 2022/0309013 A1  Sep. 29, 2022

(51) Int. Cl.
| | | |
|---|---|---|
| *G06F 13/24* | (2006.01) | |
| *G06F 9/48* | (2006.01) | |
| *G06F 9/30* | (2018.01) | |
| *G06F 13/42* | (2006.01) | |
| *G06F 13/26* | (2006.01) | |

(52) U.S. Cl.
CPC .......... *G06F 13/24* (2013.01); *G06F 9/30101* (2013.01); *G06F 9/4812* (2013.01); *G06F 9/4818* (2013.01); *G06F 9/4831* (2013.01); *G06F 13/26* (2013.01); *G06F 13/4221* (2013.01)

(58) Field of Classification Search
CPC .... G06F 13/24; G06F 9/30101; G06F 9/4812; G06F 13/4221; G06F 9/4818; G06F 9/4831; G06F 13/26
See application file for complete search history.

(56) References Cited

U.S. PATENT DOCUMENTS

| | | | | |
|---|---|---|---|---|
| 5,987,538 A | * | 11/1999 | Tavallaei | G06F 13/24 710/48 |
| 6,219,741 B1 | * | 4/2001 | Pawlowski | G06F 13/26 710/265 |
| 7,584,316 B2 | * | 9/2009 | Oner | G06F 13/4027 710/263 |
| 8,032,681 B2 | * | 10/2011 | Crossland | G06F 13/24 710/265 |
| 9,442,869 B2 | * | 9/2016 | Easwaran | G06F 13/4022 |
| 2004/0015628 A1 | * | 1/2004 | Glasco | G06F 13/24 710/260 |
| 2004/0128563 A1 | * | 7/2004 | Kaushik | G06F 9/5094 713/300 |
| 2005/0144434 A1 | * | 6/2005 | Taylor | G06F 15/177 713/2 |
| 2006/0136642 A1 | * | 6/2006 | Ooi | G06F 13/24 710/268 |

(Continued)

FOREIGN PATENT DOCUMENTS

EP   2463781 A2 *  6/2012  ............. G06F 13/24

*Primary Examiner* — Glenn A. Auve
(74) *Attorney, Agent, or Firm* — Greenberg Traurig, LLP

(57) ABSTRACT

A computing system may implement a low priority arbitration interrupt method that includes receiving a message signaled interrupt (MSI) message from an input output hub (I/O hub) transmitted over an interconnect fabric, selecting a processor to interrupt from a cluster of processors based on arbitration parameters, and communicating an interrupt service routine to the selected processor, wherein the I/O hub and the cluster of processors are located within a common domain.

20 Claims, 5 Drawing Sheets

(56) References Cited

U.S. PATENT DOCUMENTS

| | | | |
|---|---|---|---|
| 2009/0070511 A1* | 3/2009 | Kaushik | G06F 9/3891 |
| | | | 710/267 |
| 2009/0327556 A1* | 12/2009 | Railing | G06F 13/24 |
| | | | 710/267 |
| 2011/0087814 A1* | 4/2011 | Liu | G06F 9/4812 |
| | | | 710/260 |

* cited by examiner

ENHANCED LOW-PRIORITY ARBITRATION

BACKGROUND

Current computer systems include multiple processing cores or processors that receive requests to execute instructions related to tasks performed by a multitude of sources, such as peripheral devices coupled to the system, internal components, or other processors, to name a few. Certain tasks have a higher priority than others and thus may be able to use an interrupt to have a processor to execute its task's instructions over the processor's current task. An interrupt event is a request to change instruction execution from a currently executing instruction flow to another instruction flow and will use some logic to examine register values associated with processor states to determine which processor is best suited to service the interrupt request.

BRIEF DESCRIPTION OF THE DRAWINGS

The present disclosure is illustrated by way of example, and not by way of limitation, in the figures of the accompanying drawings.

DETAILED DESCRIPTION

Figure 1:
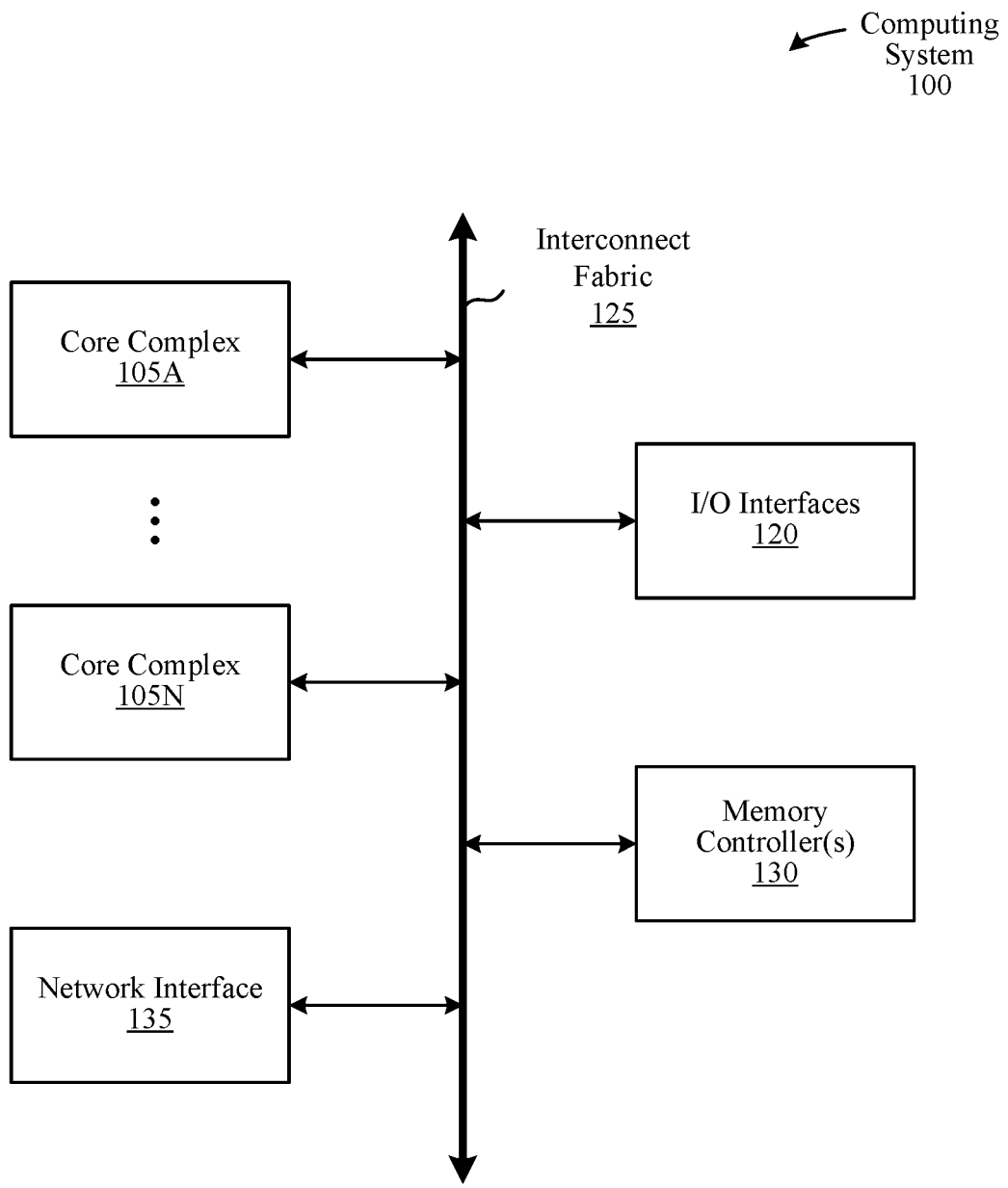
FIG. 1 illustrates a computing system, according to an embodiment.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

One embodiment of a computing system includes multiple processing units that communicate with memory and other devices via a data interconnect fabric. The data interconnect fabric connects multiple nodes in an arbitrary topology, and conveys messages between the nodes. Nodes may include various functional blocks, such as memory controllers, processor core complexes, input/output (I/O) hubs, and intra-socket extenders, among others. Messages communicated between nodes are used for various purposes, including maintaining memory coherence and transmitting interrupts generated by peripheral devices through I/O hubs.

Interrupt requests from devices are, in some embodiments, sent to interrupt controllers in messages, such as message signaled interrupts (MSI). MSIs are an in-band method of signaling, and may be transmitted and received by interrupt controllers over a data interconnect fabric between one or more nodes within the system. For example, an interrupt controller, such as a programmable interrupt controller (PIC), may receive an MSI from an I/O hub that includes one or more connected devices. The PIC may then proceed to arbitrate by selecting one processor amongst all the processors across the die that are at the lowest priority as determined by one or more arbitration parameters. Such arbitration parameters can include, for example, values in the arbitration priority register (APR), which is specified by the task priority register (TPR) and/or the current in-service vector, process priority register (PPR), etc.

However, a PIC that has to examine all of the processors across the die, and further in the case of a multi-socket system, increases the latency and decreases the bandwidth, since in many instances a processor may be selected in a distant cluster. Additionally, based on the arbitration process, a repeat interrupt may not be sent to the same processor, which means that the cache lines that are accessed by the ISR code of a processor will be transferred to the newly selected processor, creating additional latency and inefficiency.

In one embodiment, latency and inefficiency of distributing interrupts may be resolved by splitting the PICs on a die into clusters that are associated with a common domain that includes other functional blocks, such as programmable interrupt controllers and CPUs with corresponding processing cores. A non-uniform memory access (NUMA) topology, for example, is based on CPUs and memory being physically proximate to each other. In such a common domain, communication efficiency can be increased and latency can be decreased by allocating memory for a CPU within a physically closer domain versus a farther domain. Similarly, input/output NUMA (IONUMA) in large computer systems, such as server systems, may leverage the same efficiencies with input/output (IO) devices and CPUs. For example, a single socket may include 4 different IO hubs for 128 processor cores. The IONUMA domain would be split into four pieces or domains, each IO hub having 128 divided by 4, or 32 processor cores for each IO hub, that are configured to be the closest processing cores to those IO hubs. In other embodiments, the domain split may be asymmetric, or grouped to maximize other efficiencies.

The IONUMA domain may be based on physical distance between the nodes on the die, such as the nodes associated with an I/O hub (e.g., IO master block), PIC clusters (e.g., interrupt controller block), a core complex (e.g., cache coherent master block), and interconnected using a data fabric and forwarding logic. For example, the IONUMA methodology may be implemented by the nodes and connected blocks within the domain using a bias table that groups the cores on a die with devices associated with the IO hub closest in proximity. Interrupt service routines executing within the domain will select the low priority arbitration (LPA) process to evaluate and deliver the interrupt to a processor within the domain.

FIG. 1 illustrates a block diagram of one embodiment of a computing system 100, in which low priority arbitration is implemented. Computing system 100 includes at least core complexes 105A-N, input/output (I/O) interfaces 120, interconnect fabric 125, memory controller(s) 130, and network interface 135. In other embodiments, computer system 100 may include other components and/or be arranged in other configurations.

Each core complex 105A-N may include one or more general purpose processors (e.g., central processing units (CPUs)) and associated cache subsystem (not shown). It is noted that a "core complex" is also referred to as a "processing node", "processing unit" or a "CPU", and "processor" is also referred to as "core" or "processing core" herein. In some embodiments, one or more core complexes 105A-N include a data parallel processor with a highly parallel architecture, for example, graphics processing units (GPUs) and digital signal processors (DSPs), and so forth.

Memory controller(s) 130 are representative of any number and type of memory controllers accessible by core complexes 105A-N. Memory controller(s) 130 may be coupled to any number and type of memory devices (not shown). For example, memory devices such as random-access memory (RAM) modules, dynamic random-access memory (DRAM) modules, static random access memory (SRAM), NAND flash memory, NOR flash memory, ferro-electric random access memory (FeRAM), read-only memory (ROM) modules, bit registers, hard disks, and other non-transitory computer-readable media.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices may be coupled to I/O interfaces 120. Such peripheral devices include (but are not limited to) displays, keyboards, mice, printers, scanners, joysticks or other types of game controllers, media recording devices, external storage devices, network interface cards, and so forth.

In general, the computing system 100 may be embodied as any number of different types of devices, including but not limited to, a laptop or desktop computer, mobile device, server, etc. Some embodiments of computing system 100 may include fewer or more components than the embodiment as illustrated in FIG. 1. Additionally, in other embodiments, computing system 100 may be structured in other ways than shown in FIG. 1.

Figure 2:
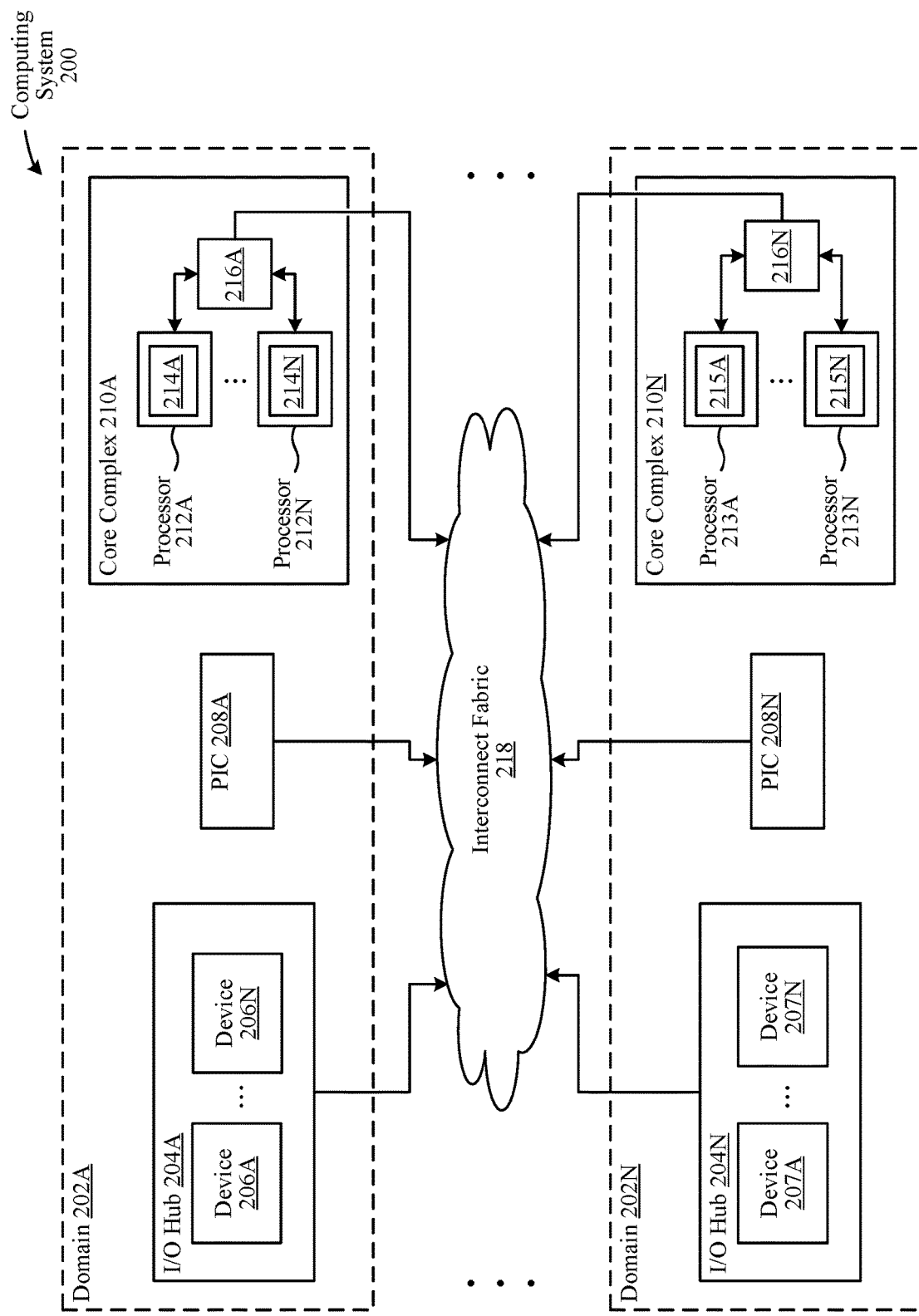
FIG. 2 illustrates components in a computing system, according to an embodiment.

FIG. 2 is a block diagram of computing system 200 illustrating specific components in the computing system 100, according to one embodiment. In various embodiments, the computing system 200 may be a system on chip (SoC), a multi-socket computer system, or any of various other types of computing systems that implement interrupt service routines and processes.

As illustrated in FIG. 2, the computing system 200 includes domains 202A-N, such as an IONUMA domain as described above. In various embodiments, domains 202A-N are logically divided up within computing system 200 using at least one of software, firmware and physical layout of the computing system 200, or any combination thereof. Each domain, according to one embodiment, respectively includes I/O hub 204A-N, programmable interrupt controller (PIC) 208A-N, and core complex 210A-N. Each I/O hub, according to one embodiment, includes and is connected to, one or more devices, such as devices 206A-N of I/O hub 204A and devices 207A-N of I/O hub 204N. Additionally, each core complex includes multiple processors and corresponding interrupt controllers, and a cache subsystem, such as processors 212A-N of I/O hub 204A having caches 214A-N and processors 213A-N of I/O hub 204N having caches 215A-N, programmable interrupt controllers 208A-N, and cache subsystem 216A of core complex 210A and cache subsystem 216N of core complex 210N.

Each domain includes nodes that further include functional blocks (e.g., I/O hub 204A and PIC 208A) that are communicatively connected to each other and other components (not shown) through an interconnect fabric 218. The interconnect fabric 218 represents a network of communication links within computing system 200. In one embodiment, the interconnect fabric uses logic (e.g., a network switch not shown) within various nodes of the computing system 200 to examine communication messages (e.g., data and command packets) between nodes and blocks (e.g., I/O hub 204A and PIC 208A) and make forwarding decisions accordingly.

In one embodiment, the PIC 208A within domain 202A processes all low priority arbitration (LPA) messages from devices that are within the same domain, such as devices 206A-N of I/O hub 204A. For example, device 206A via I/O hub 204A broadcasts messages for interrupts (e.g., message signaled interrupts (MSIs)) to the PIC 208A within its own domain, as opposed to a global broadcast to any or all other domains, such as domain 202N. The PIC 208A receives the MSI from the device 206A and decodes it as an LPA interrupt. The PIC 208A then begins an arbitration process to determine which of the processors 212A-N within its domain to interrupt based on the priority state of the processor. For example, this may include the PIC 208A sending an interrupt to a processor to cause the processor to execute an interrupt service request (ISR) routine, and the processor may be selected from a cluster of processors based on arbitration parameters. Specifically, the code and data for the ISR is held in the processor's cache subsystem, such as cache subsystem 216A of core complex 210A. The MSI message may include, among other things, information such as requester identification (ID), destination identifier, delivery mode, interrupt vector, or other suitable information.

In various embodiments, the arbitration parameters may be based on at least one or all of a priority value, processor state, and prior interrupt activity for the processors, such as an arbitration priority register (APR) value or a history of prior interrupt vector(s) that have been arbitrated or sent to the processor, respectively.

Figure 3:
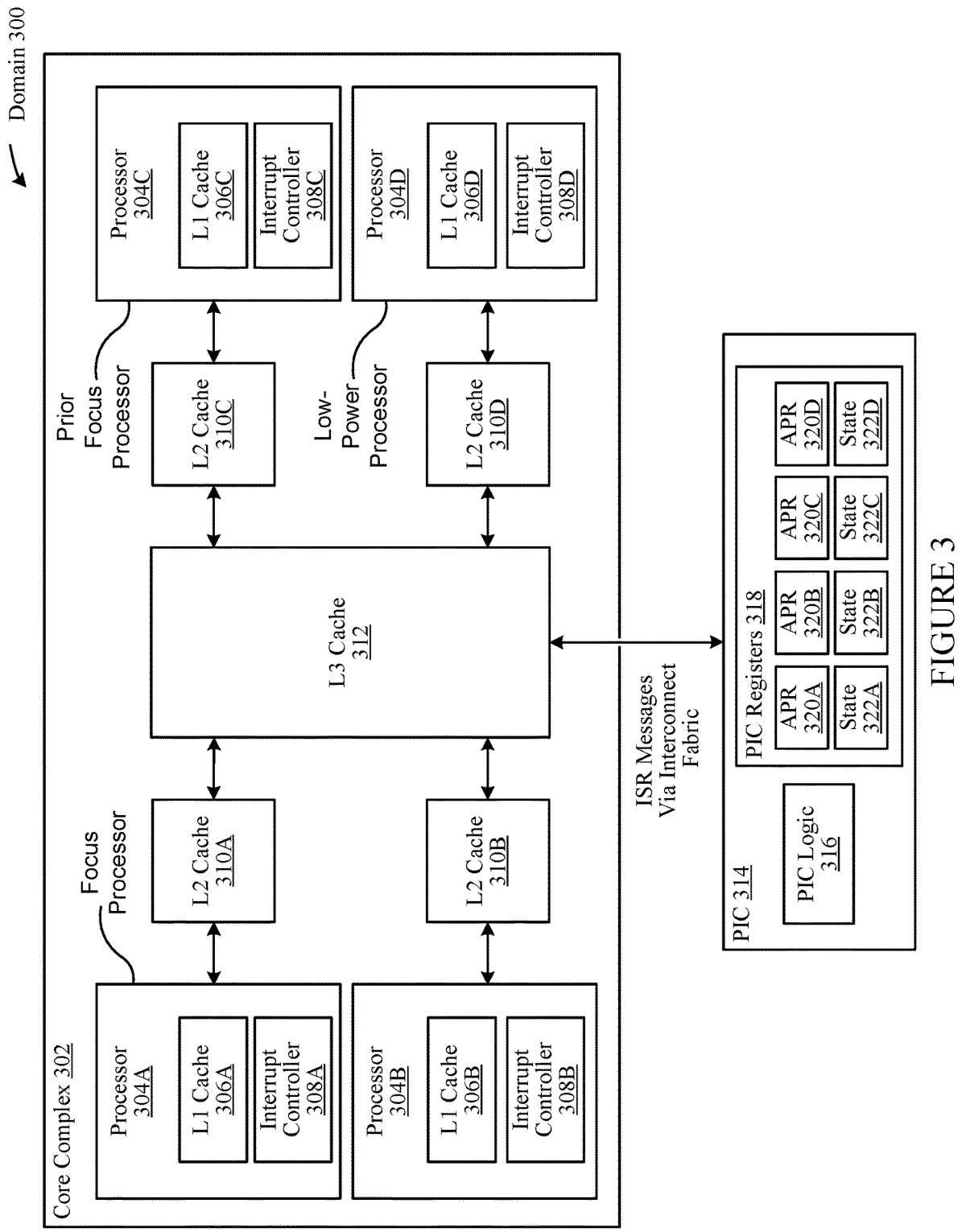
FIG. 3 illustrates a domain within a computer system for processing low priority interrupts, according to one embodiment.

FIG. 3 illustrates a domain 300 for processing low priority interrupts, according to one embodiment, that may be found within a computer system, such as domain 202A in computing system 200. The domain 300 includes a core complex 302, that includes processors 304A-D, each processor includes, respectively, interrupt controllers 308A-D, L1 cache 306A-D, L2 caches 310A-D, and L3 cache 312. For simplicity, four processors and L2 caches are illustrated, however, there may be any number based on design choice, such as shown with respect to FIG. 2 processors 212A-N of core complex 210A.

L3 cache 312 is coupled to an interconnect fabric (e.g., interconnect fabric 218 of FIG. 2). L3 cache 312 receives interrupt messages via the interconnect fabric and forwards interrupt messages to L2 caches 310A-D. In one embodiment, L3 cache 312 broadcasts received interrupt messages to all L2 caches 310A-D. In an alternative embodiment, L3 cache 312 forwards a received interrupt message to those L2 caches 310A-D targeted by the interrupt message. The L2 caches 310A-D forward interrupt messages for processing to interrupt controllers 208A-D, respectively.

Domain 300 further includes a programmable interrupt controller (PIC) 314, which includes PIC logic 316 and PIC registers 318 including the arbitration priority registers (APR) 320A-D and state registers 322A-D for all processors that are within the same IONUMA domain. In one embodiment, the state register is the current state of its corresponding processor, for example, the register may indicate that the processor is in a low-power state, or whether the processor is a focus processor or prior-focus processor for a particular interrupt vector. The PIC 314 includes a communication port that is communicatively connected to the core complex 302 through an interconnect fabric, such as described with respect to the interconnect fabric 218 of FIG. 2. Although illustrated here as registers, PIC registers 318 may be any suitable storage medium for storing and recalling bits and data to process interrupts in domain 300. For clarity, one PIC is illustrated, however in other embodiments, there may multiple PICs divided amongst one or more core complexes, or group of processors. In one embodiment, each of multiple PICs may be assigned a group of processors within the same cache domain, based on the locality to the I/O devices and/or other factors. The number of PICs may be equal to the number of I/O hubs, and each I/O hub may send MSIs to the PIC that contains all of the APRs for all the cores that are also assigned to the same IONUMA domain as that I/O hub.

In one embodiment, the PIC logic 316 is used to process an LPA interrupt upon the PIC 314 receiving an MSI message from a device (e.g., device 206A of FIG. 2). The PIC assigned to process the LPA interrupt for a device is determined by which processors are within the same IONUMA domain as that device. The PIC logic 316 may then determine which processor is to execute an interrupt service routine (ISR) based on arbitration parameters and then communicates the interrupt to the selected processor. If the arbitration parameter used in an LPA process is based on the prior selection of a processor for an ISR, according to one embodiment, then a determination is made if a processor within the core complex 302 is a focus processor or a prior focus processor. A focus processor, such as processor 304A, is a processor within the domain 300 that is processing or scheduled to process the same interrupt vector as the current ISR being assigned by PIC 314. According to one embodiment, using a focus processor allows the interrupt process to use a singular execution of the ISR routine to handle multiple interrupts from the same device in the computing system 200.

A prior focus processor, such as processor 304C, is a processor within the domain 300 that has previously processed the same interrupt vector as the current ISR being assigned. Utilizing the prior focus processor, according to one embodiment, promotes ISR cache efficiency by prioritizing the prior focus processor to get the same interrupt vector again without involving the other processors and PICs (other than PIC 314) within the domain 300 in an arbitration process, since the prior focus processor may have still have the ISR code and/or data in their cache and ready to execute.

The PIC logic 316 may also consider other arbitration parameters in addition to whether a processor may be a focus or prior focus processor to make LPA decisions. For example, arbitration parameters such as the arbitration priority register (APR) value and the current state of each processor, as may be indicated according to one embodiment, in APR 320A-D and the state registers 322A-D for each processor 304A-D, respectively. In one embodiment, the LPA selection process implemented by PIC logic 316 may include a round robin approach or other selection algorithm to load balance and select from processors 304A-D that may have the same lowest priority APR value as determined from each APR 320A-D value (e.g., APR value 00), respectively. In addition, the LPA algorithm may be configured, in various embodiments, to either include or omit processors in a low-power state based on at least the APR values of the other processors and whether the LPA algorithm is optimizing for power consumption or interrupt bandwidth. It may be advantageous to remove processors in a low-power state from consideration because a processor in a low-power state will consume time and resources to ramp up its voltage and clocks and restore its state, which may not be preferred if the system is optimized for interrupt bandwidth to reduce interrupt latency.

The LPA process may consider one, some or all of these arbitration parameters in selecting a processor to send an interrupt within domain 300. Additionally, the PIC logic 316 in the LPA selection process, in one embodiment, may consider the APR values for a focus processor and prior focus processor. If the APR value for either exceeds a threshold value, the focus or prior focus processor may not efficiently handle another interrupt, whether it is for the same interrupt vector or not. The process would then continue, as described above and below (see FIG. 3), to pick another processor. In one embodiment, if the LPA selection process determines there are no available processors within domain 300 based on the arbitration parameters, then it may communicate with other domains within the system (e.g., domain 202N of computing system 200 in FIG. 2) to take and service the interrupt.

Figure 4:
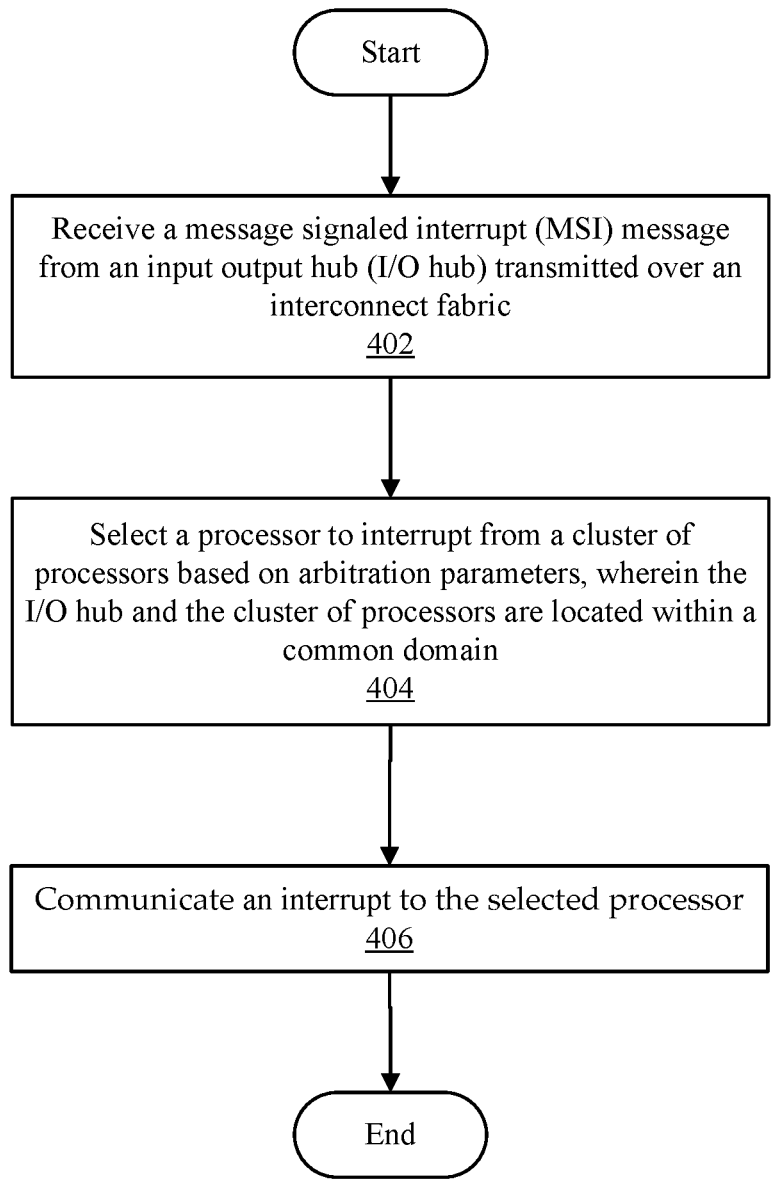
FIG. 4 illustrates an embodiment of a low priority arbitration (LPA) selection process.

FIG. 4 illustrates an embodiment of a low priority arbitration (LPA) selection process 400. At block 402 a programmable interrupt controller (e.g., PIC 208A of FIG. 2) receives a message signaled interrupt (MSI) message from an input output hub (e.g., I/O hub 204A of FIG. 2) that is transmitted over an interconnect fabric (e.g., interconnect fabric 218 of FIG. 2). The PIC then selects, at block 404, a processor to interrupt from a cluster of processors based on arbitration parameters (e.g., APR value, processor state, interrupt service routine (ISR) status), wherein the I/O hub and the cluster of processors are located within a common domain (e.g., domain 202A). In one embodiment, the domain is logically divided within the computer system based on physical proximity. At block 406, the PIC communicates an interrupt to the selected processor, which then executes an ISR and stores the ISR in its cache.

Figure 5:
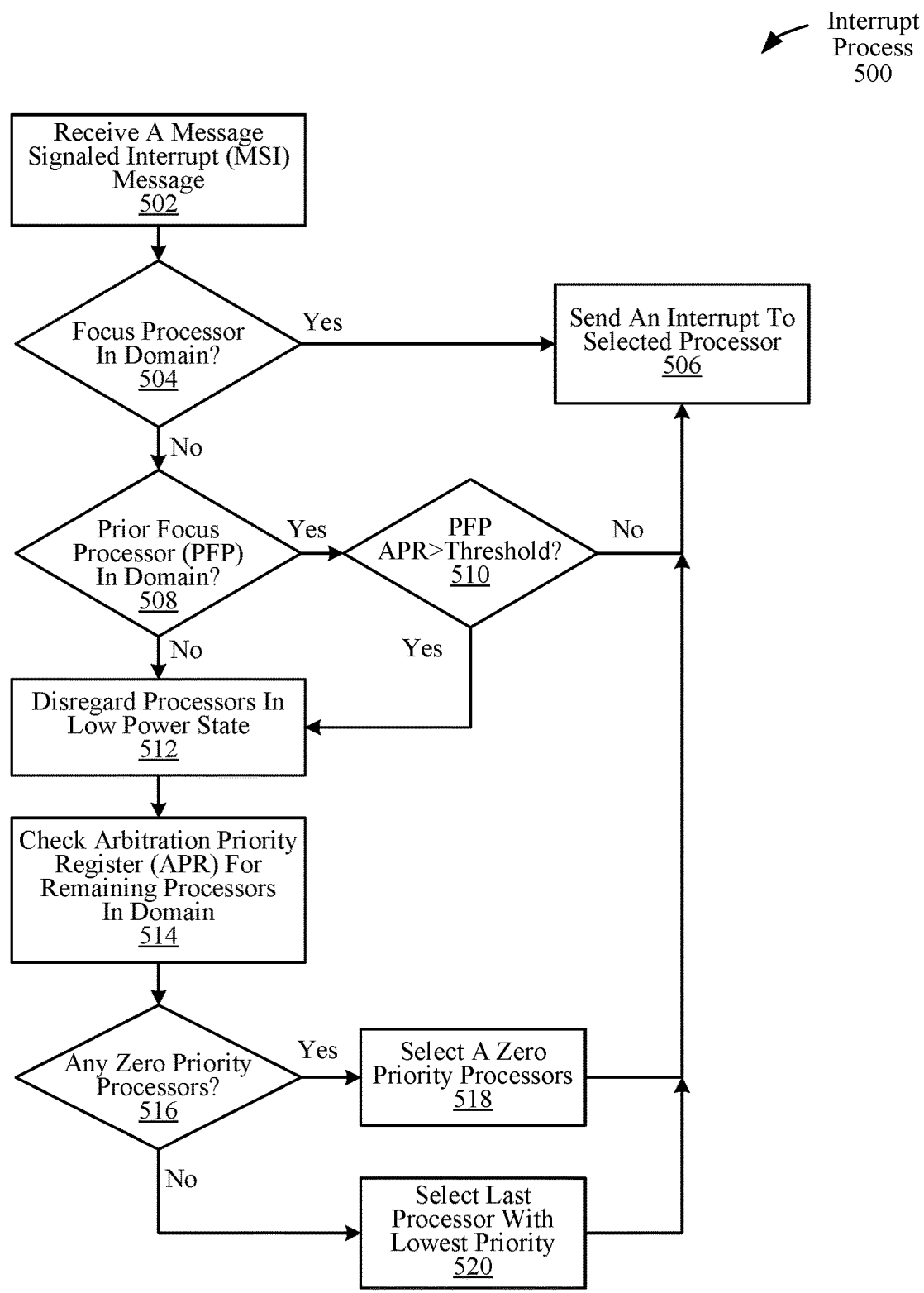
FIG. 5 illustrates an embodiment of a low priority arbitration (LPA) selection process.

FIG. 5 illustrates an embodiment of a low priority arbitration (LPA) selection process 500 that may be executed by various components of computing system 100, computing system 200, and domain 300. The process begins at block 502 where a programmable interrupt controller (e.g., PIC 314 of FIG. 3) receives a message signaled interrupt message (MSI) from a component in a computer system (e.g., device 206A of FIG. 2) in its domain requiring interrupt service from a processor. At decision block 504, the PIC determines if there is a focus processor in its domain that is already processing or about to process the same interrupt vector as included in the MSI. If yes, then the PIC sends the interrupt to the selected processor at block 506. If no, the process continues to decision block 508, where the PIC determines if there is a prior focus processor in its domain. If yes, the PIC at decision block 510 checks if the arbitration priority register for the prior focus processor exceeds a threshold value indicating the processor workload is too high for the interrupt. If the threshold is not met, the PIC sends the interrupt to the selected processor at block 506. If the APR threshold is met at decision block 510 or if there is not a prior focus processor at decision block 508, the process of selecting a processor continues at block 512 where the PIC disregards or removes from consideration processors in a low-power state. In other embodiments, block 512 may be optional and low-power state processors are not removed and are considered in the selection process, or may be considered later in the process if no other processors are available.

At block 514, the PIC checks the arbitration priority register (APR) value for the remaining processors in the domain. At decision block 516, if there are any processors at a zero APR value (indicating the lowest priority), one is selected at block 518 and the PIC sends the interrupt to the selected processor at block 506. If there are not any zero APR value processors, the PIC selects the last processor with the lowest APR value, at block 520, and sends the interrupt to the selected processor at block 506. As discussed above, in various embodiments, the selection algorithm, if there are multiple processors in the domain with the lowest priority, may be round robin or another selection algorithm such that the load is evenly distributed among the processors.

A system of one or more computers can be configured to perform particular operations or actions by virtue of having software, firmware, hardware, or a combination of them installed on the system that in operation causes or cause the system to perform the actions. The low priority arbitration interrupt method includes receiving a message signaled interrupt (MSI) request message from an input output hub (TO hub) transmitted over an interconnect fabric. The method also includes selecting a processor to interrupt from a cluster of processors based on arbitration parameters. The method also includes communicating an interrupt routine to the selected processor. The method also includes where the IO hub and the cluster of processors are located within a common domain. Other embodiments of this aspect include corresponding computer systems, apparatus, and computer programs recorded on one or more computer storage devices, each configured to perform the actions of the methods.

Implementations may include one or more of the following features. The method where the selecting the processor based on the arbitration parameters may include selecting a focus processor that is processing or scheduled to process the same interrupt vector for another interrupt request. The method may include removing from the selecting of the processor to service the interrupt from the cluster of processors one or more processors in a low-power state. The selecting the processor based on the arbitration parameters may include selecting a prior focus processor that has previously processed the same interrupt vector for another interrupt. The method may include the following: if the prior focus processor has an arbitration priority register (APR) value higher than a threshold value, reading the APR value for each processor of the cluster of processors; if at least one of the one or more processors has a zero APR value, selecting the processor having the zero APR value; and if none of the one or more processors have a zero APR value, selecting the last processor with the lowest APR value. The selecting the processor based on the arbitration parameters may include selecting a processor in the same cache domain as a prior focus processor that has previously processed the same interrupt vector for another interrupt. The selecting the processor based on the arbitration parameters may include selecting a processor based on an arbitration priority register (APR) value. The method may include omitting or removing processors in low-power state from selection among the cluster of processors. Implementations of the described techniques may include hardware, a method or process, or computer software on a computer-accessible medium.

The embodiments described herein may include various operations and processes. These may be performed by hardware components, software, firmware, or a combination thereof. As used herein, the term "coupled to" may mean coupled directly or indirectly through one or more intervening components. Any of the signals provided over various lines and buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 200 and/or portions thereof carried on the computer-readable storage medium may be a database or other data structure which can be read by a program and used, directly or indirectly, to fabricate the hardware comprising the computing system 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computing system 200. The netlist may then be placed and routed to produce a data set describing geometric shapes to be applied to masks. The masks may then be used in various semiconductor fabrication steps to produce a semiconductor circuit or circuits corresponding to the computing system 200. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A priority arbitration interrupt method, comprising:
receiving an interrupt request from an input output hub (I/O hub) transmitted over an interconnect fabric;
in response to receiving the interrupt request, selecting a processor to interrupt from a cluster of processors based on the processor residing in a common domain with the I/O hub; and
communicating an interrupt routine to the selected processor.

2. The method of claim 1, wherein the selecting the processor is based on arbitration parameters and further comprises selecting a focus processor that is processing or scheduled to process a same interrupt vector for another interrupt as for the received interrupt request.

3. The method of claim 1, further comprising excluding one or more processors from the selecting of the processor to service the interrupt from the cluster of processors based on a power state of the one or more processors.

4. The method of claim 1, wherein the selecting the processor is based on arbitration parameters and further comprises selecting a prior focus processor that has previously processed a same interrupt vector for another interrupt as for the received interrupt request.

5. The method of claim 4, further comprising:
if the prior focus processor has an arbitration priority register (APR) value higher than a threshold value, reading the APR value for each processor of the cluster of processors;
if at least one processor of the cluster of processors has a zero APR value, selecting the processor having the zero APR value; and
if no processors of the cluster of processors have a zero APR value, selecting a last processor with a lowest APR value.

6. The method of claim 1, wherein the selecting the processor is based on arbitration parameters and further comprises selecting a processor in a same cache domain as a prior focus processor that has previously processed a same interrupt vector for another interrupt request as for the received interrupt request.

7. The method of claim 1, wherein the selecting the processor is based on arbitration parameters and further comprises selecting a processor based on an arbitration priority register (APR) value.

8. The method of claim 1, further comprising omitting one or more processors from the selecting based on the one or more processors having a lower power state than one or more other processors in the cluster of processors.

9. A programmable interrupt controller (PIC), comprising:
an input configured to receive over an interconnect fabric an interrupt request from a device coupled to an input output hub (I/O hub); and
PIC logic configured to:
in response to receiving the interrupt request, select a processor to interrupt from a cluster of processors based on the processor residing in a same domain as the I/O hub and PIC, and
communicate an interrupt service routine to the selected processor.

10. The programmable interrupt controller of claim 9, wherein the PIC logic is further configured to select the processor based on arbitration parameters by selecting a focus processor that is processing or scheduled to process a same interrupt vector for another interrupt message as for the interrupt request.

11. The programmable interrupt controller of claim 9, wherein the PIC logic is further configured to, when selecting the processor to interrupt, exclude one or more processors of the cluster of processors from selection based on a power state of the one or more processors.

12. The programmable interrupt controller of claim 9, wherein the PIC logic is further configured to select the processor based on arbitration parameters by selecting a prior focus processor that has previously processed a same interrupt vector for another interrupt message as for the interrupt request.

13. The programmable interrupt controller of claim 12, wherein the PIC logic is further configured to:
if the prior focus processor has an arbitration priority register (APR) value higher than a threshold value, select the processor from one or more processors that have a zero APR value if at least one of the one or more processors has a zero APR value, and
select a last processor with a lowest APR value if none of the one or more processors have a zero APR value.

14. The programmable interrupt controller of claim 9, wherein the PIC logic is configured to select the processor based on arbitration parameters by selecting a processor in a same cache domain as a prior focus processor that has previously processed a same interrupt vector for another interrupt message as for the interrupt request.

15. The programmable interrupt controller of claim 9, wherein the PIC logic is further configured to select the processor based on arbitration parameters by selecting a processor based on an arbitration priority register (APR) value.

16. The programmable interrupt controller of claim 9, wherein the PIC logic is further configured to omit one or more processors from selection from among the cluster of processors based on the one or more processors having a lower power state than one or more other processors in the cluster of processors.

17. A computing system, comprising:
an interconnect fabric;
a core complex comprising a cluster of processors, the core complex coupled with the interconnect fabric;
a programmable interrupt controller (PIC) coupled to PIC registers comprising arbitration priority registers (APR) and state registers, each APR and state register corresponding to a respective processor of the cluster of processors; and
an input/output hub (I/O hub) coupled to one or more devices and the interconnect fabric, the I/O hub to send an interrupt request from the one or more devices to the PIC over the interconnect fabric, the PIC to select a processor to interrupt from the cluster of processors in the core complex based on the processor residing within a common domain with the I/O hub.

18. The computing system of claim 17, wherein the PIC is further configured to select the processor based on arbitration parameters by selecting a prior focus processor that has previously processed a same interrupt vector for another interrupt request as for the sent interrupt request.

19. The computing system of claim 18, wherein the PIC is further configured to, if the prior focus processor has an APR value higher than a threshold value:
select the processor from the cluster of processors that have a zero APR value if at least one processor in the cluster of processors has a zero APR value; and
if none of the cluster of processors have a zero APR value, select a last processor with a lowest APR value.

20. The computing system of claim 18, wherein the PIC is further configured to select the processor based on arbitration parameters by selecting the processor in a same cache domain as the prior focus processor that has previously processed a same interrupt vector for another interrupt request as for the sent interrupt request.

* * * * *